US010912041B2

(12) United States Patent
Lee et al.

(10) Patent No.: US 10,912,041 B2
(45) Date of Patent: Feb. 2, 2021

(54) METHOD FOR TRIGGERING A POWER HEADROOM REPORTING IN WIRELESS COMMUNICATION SYSTEM AND A DEVICE THEREFOR

(71) Applicant: LG ELECTRONICS INC., Seoul (KR)

(72) Inventors: Eunjong Lee, Seoul (KR); Sunyoung Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/100,899

(22) Filed: Aug. 10, 2018

(65) Prior Publication Data
US 2019/0053170 A1    Feb. 14, 2019

Related U.S. Application Data

(60) Provisional application No. 62/543,982, filed on Aug. 11, 2017.

(51) Int. Cl.
*H04W 52/36* (2009.01)
*H04W 24/10* (2009.01)
*H04W 68/02* (2009.01)
*H04W 72/04* (2009.01)
*H04W 76/27* (2018.01)
*H04B 7/06* (2006.01)
*H04B 7/0408* (2017.01)
*H04W 80/02* (2009.01)
*H04W 52/34* (2009.01)

(52) U.S. Cl.
CPC ........ *H04W 52/365* (2013.01); *H04B 7/0408* (2013.01); *H04B 7/0617* (2013.01); *H04W 24/10* (2013.01); *H04W 68/02* (2013.01); *H04W 72/042* (2013.01); *H04W 76/27* (2018.02); *H04W 52/34* (2013.01); *H04W 80/02* (2013.01)

(58) Field of Classification Search
CPC . H04W 52/365; H04W 72/042; H04W 24/10; H04W 68/02; H04W 76/27; H04W 52/34; H04W 80/02; H04B 7/0408; H04B 7/0617
See application file for complete search history.

(56) References Cited

U.S. PATENT DOCUMENTS

| | | | | |
|---|---|---|---|---|
| 2013/0128856 A1* | 5/2013 | Iwai | ........................ | H04L 5/001 370/329 |
| 2015/0195866 A1* | 7/2015 | Lee | .................... | H04W 52/0216 370/311 |
| 2016/0029323 A1* | 1/2016 | Hwang | .................. | H04W 52/08 370/280 |
| 2018/0324715 A1* | 11/2018 | Ryoo | .................. | H04W 52/365 |

\* cited by examiner

*Primary Examiner* — Walter J Divito
(74) *Attorney, Agent, or Firm* — Birch, Stewart, Kolasch & Birch, LLP

(57) ABSTRACT

The present invention relates to a wireless communication system. More specifically, the present invention relates to a method and a device for triggering a power headroom reporting in wireless communication system, the method comprising: triggering a Power Headroom Reporting (PHR) when a timer expires or has expired and a status of one of multiple bandwidth parts or multiple beams, which are to be used by the UE, is changed; and transmitting the triggered PHR to a network.

6 Claims, 16 Drawing Sheets

(a) Control-Plane Protocol Stack (b) User-Plane Protocol Stack (a) Control-Plane Protocol Stack (b) User-Plane Protocol Stack

FIG. 7c

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, PCell) ||||||
| R | R | $P_{CMAX,c}$ 1 ||||||
| P | V | PH (Type 1, PCell) ||||||
| R | R | $P_{CMAX,c}$ 2 ||||||
| P | V | PH (Type x, SCell 1) ||||||
| R | R | $P_{CMAX,c}$ 3 ||||||

...

| P | V | PH (Type x, SCell n) ||||||
|---|---|---|---|---|---|---|---|
| R | R | $P_{CMAX,c}$ m ||||||

FIG. 7d

| R | R | PH (Type X, PCell) |
|---|---|---|
| R | R | $P_{CMAX,c}$ |

FIG. 7e

| $C_7$ | $C_6$ | $C_5$ | $C_4$ | $C_3$ | $C_2$ | $C_1$ | R |
|---|---|---|---|---|---|---|---|
| P | V | \multicolumn{6}{l|}{PH (Type 2, PCell)} |
| R | R | \multicolumn{6}{l|}{$P_{CMAX,c}$ 1} |
| P | V | \multicolumn{6}{l|}{PH (Type 2, PSCell or PUCCH SCell)} |
| R | R | \multicolumn{6}{l|}{$P_{CMAX,c}$ 2} |
| P | V | \multicolumn{6}{l|}{PH (Type X, PCell)} |
| R | R | \multicolumn{6}{l|}{$P_{CMAX,c}$ 3} |
| P | V | \multicolumn{6}{l|}{PH (Type X, SCell 1)} |
| R | R | \multicolumn{6}{l|}{$P_{CMAX,c}$ 4} |

...

| P | V | PH (Type X, SCell n) |
|---|---|---|
| R | R | $P_{CMAX,c}$ m |

FIG. 7f

| | | | | | | | |
|---|---|---|---|---|---|---|---|
| $C_7$ | $C_6$ | $C_5$ | $C_4$ | $C_3$ | $C_2$ | $C_1$ | R |
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| P | V | PH (Type 2, PCell) | | | | | |
| R | R | $P_{CMAX,c}$ 1 | | | | | |
| P | V | PH (Type 2, PSCell or PUCCH SCell) | | | | | |
| R | R | $P_{CMAX,c}$ 2 | | | | | |
| P | V | PH (Type X, PCell) | | | | | |
| R | R | $P_{CMAX,c}$ 3 | | | | | |
| P | V | PH (Type X, SCell 1) | | | | | |
| R | R | $P_{CMAX,c}$ 4 | | | | | |

...

| | | |
|---|---|---|
| P | V | PH (Type X, SCell n) |
| R | R | $P_{CMAX,c}$ m |

(b) An example of multiple beam pair links between different TRPs (a) An example of multiple beam pair links within a TRP

METHOD FOR TRIGGERING A POWER HEADROOM REPORTING IN WIRELESS COMMUNICATION SYSTEM AND A DEVICE THEREFOR

This application claims the benefit of the U.S. Patent Application No. 62/543,982 filed on Aug. 11, 2017 which is hereby incorporated by reference as if fully set forth herein.

BACKGROUND OF THE INVENTION

Field of the Invention

The present invention relates to a wireless communication system and, more particularly, to a method for triggering a power headroom reporting in wireless communication system and a device therefor.

Discussion of the Related Art

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. Details of the technical specifications of UMTS and E-UMTS are provided in Release 7 and Release 8 of "3rd Generation Partnership Project; Technical Specification Group Radio Access Network", for example.

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

As more and more communication devices demand larger communication capacity, there is a need for improved mobile broadband communication compared to existing RAT. Also, massive machine type communication (MTC), which provides various services by connecting many devices and objects, is one of the major issues to be considered in the next generation communication (NR, New Radio). In addition, a communication system design considering a service/UE sensitive to reliability and latency is being discussed. The introduction of next-generation RAT, which takes into account such Enhanced Mobile BroadBand (eMBB) transmission, and ultra-reliable and low latency communication (URLLC) transmission, is being discussed.

SUMMARY OF THE INVENTION

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

FIGS. 7A-7F are diagrams for signaling of power headroom reporting via a MAC CE.

DETAILED DESCRIPTION OF THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described in the context of a long term evolution (LTE) system and a LTE-advanced (LTE-A) system in the present specification, they are purely exemplary. Therefore, the embodiments of the present invention are applicable to any other communication system corresponding to the above definition. An exemplary system in which the invention disclosed herein may be implemented is a system compliant with the 3GPP specification TS 36.321 Version 12.6.0. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

Figure 1:
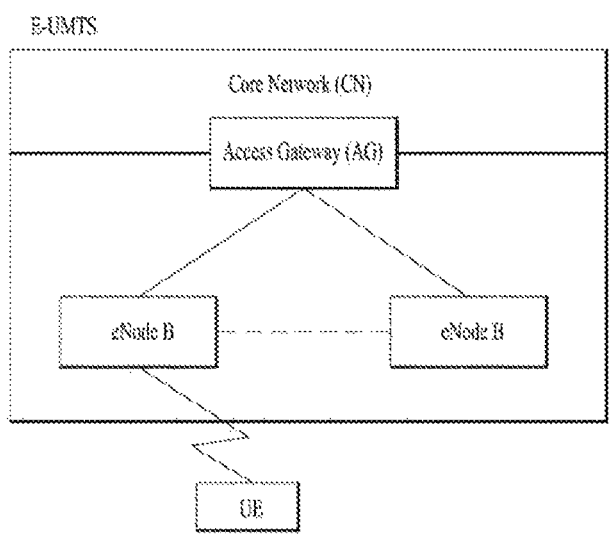
FIG. 1 is a diagram showing a network structure of an Evolved Universal Mobile Telecommunications System (E-UMTS) as an example of a wireless communication system.
Figure 2A:
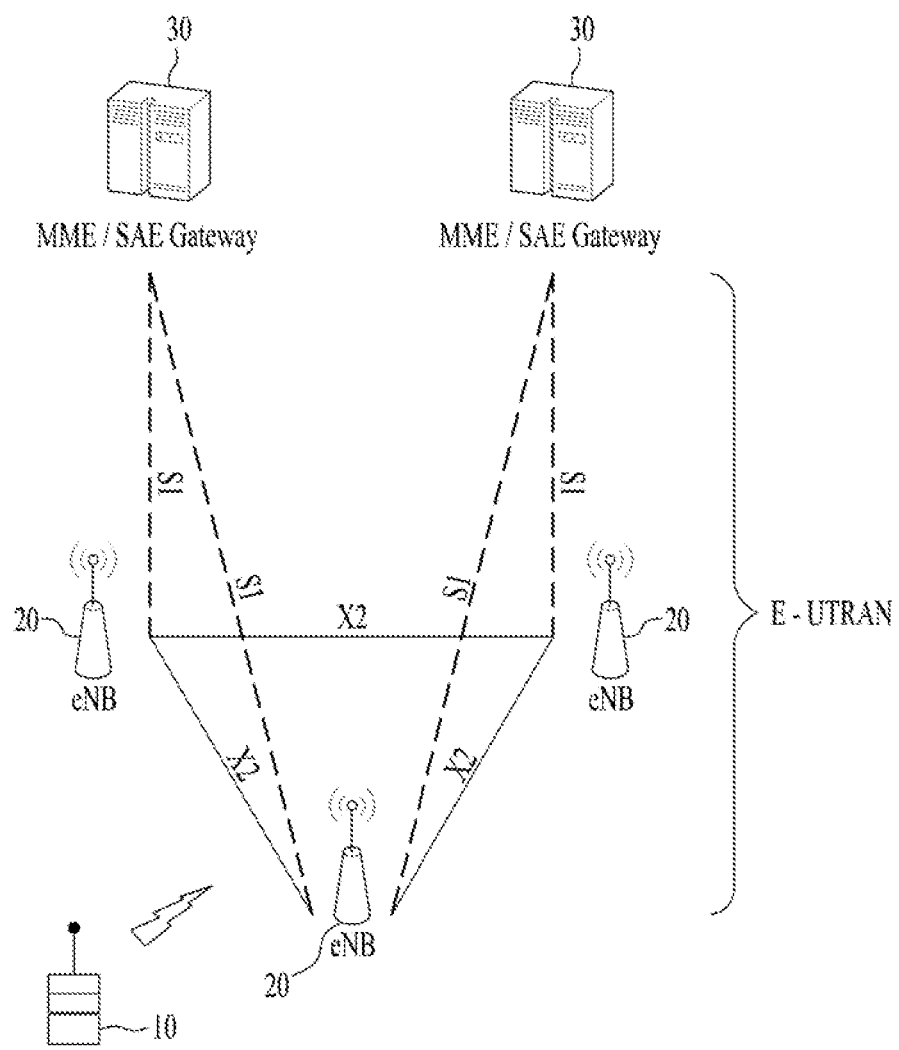
FIG. 2A is a block diagram illustrating network structure of an evolved universal mobile telecommunication system (E-UMTS)

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

Figure 2B:
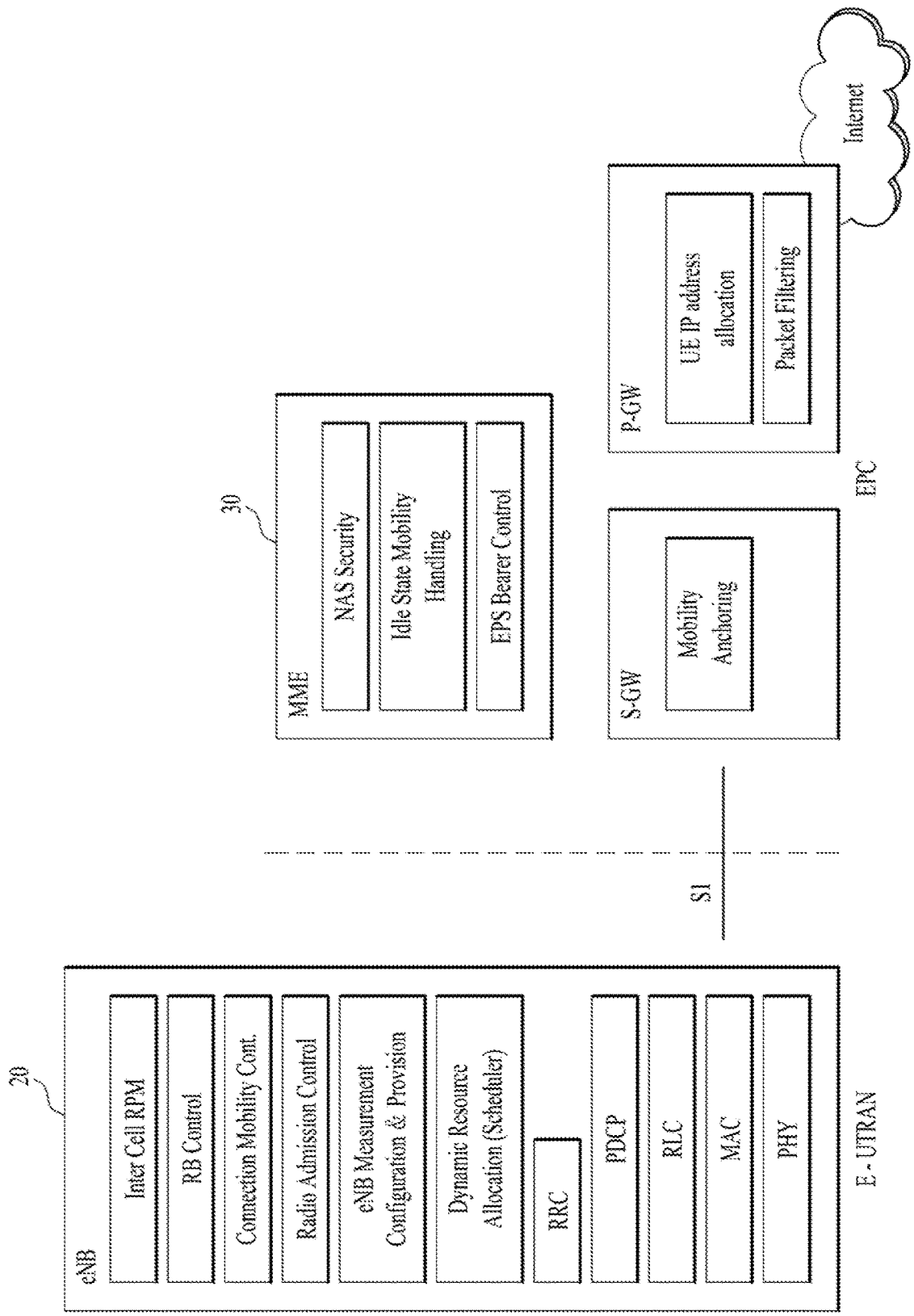
FIG. 2B is a block diagram depicting architecture of a typical E-UTRAN and a typical EPC.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

Figure 3:
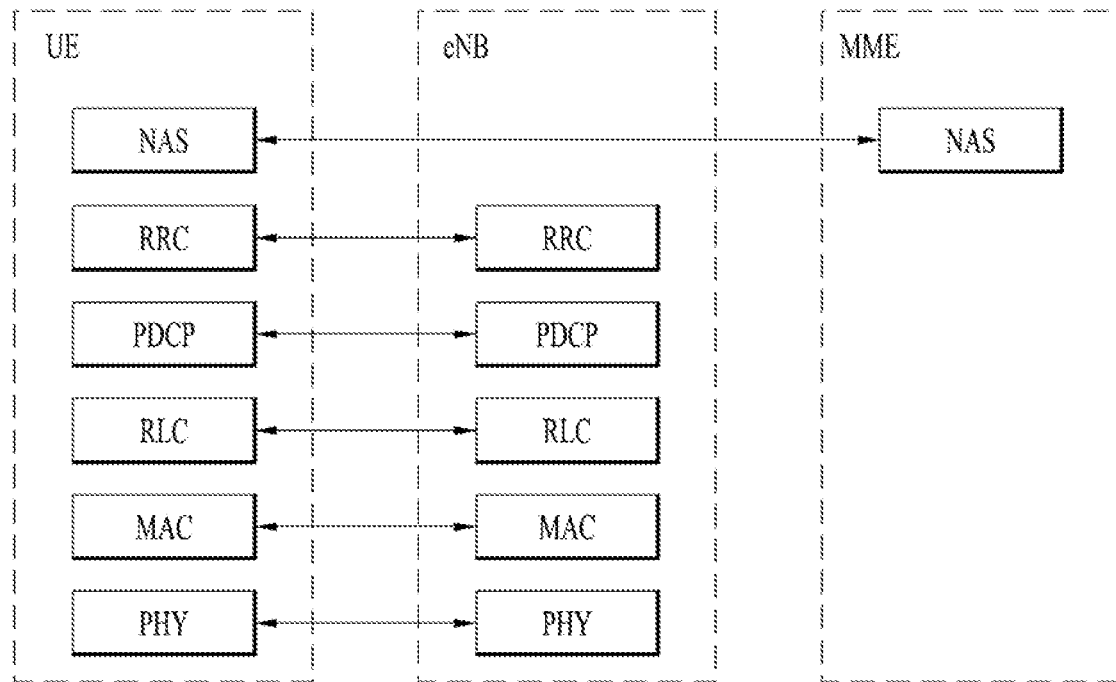
FIG. 3 is a diagram showing a control plane and a user plane of a radio interface protocol between a UE and an E-UTRAN based on a 3rd generation partnership project (3GPP) radio access network standard.
Figure 3:
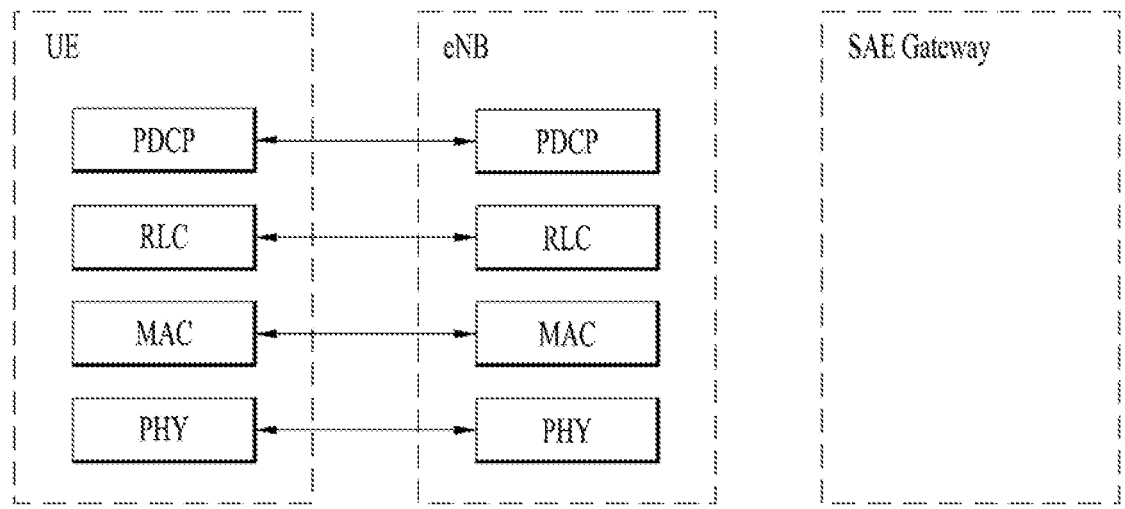

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

Figure 4A:
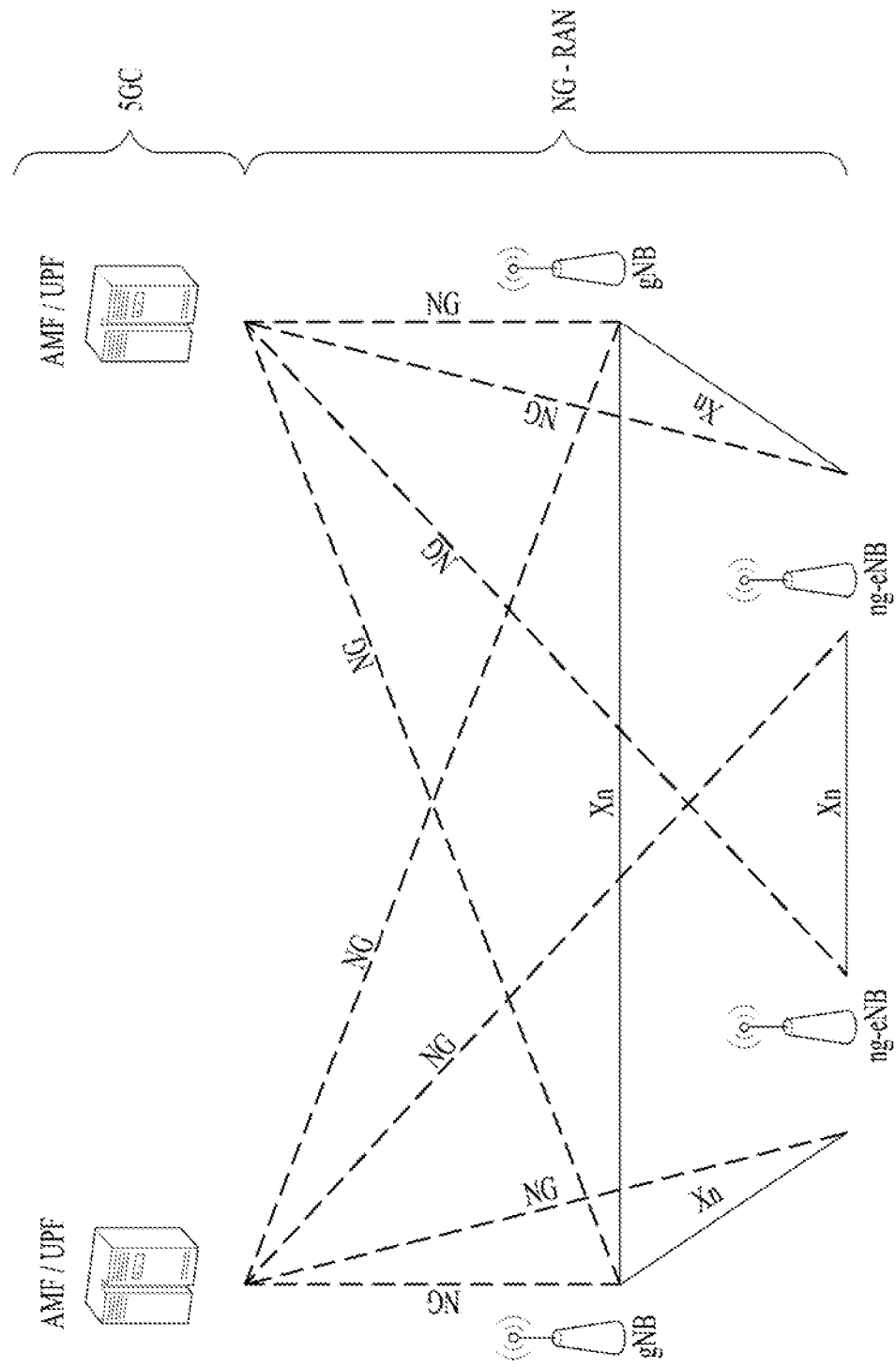
FIG. 4A is a block diagram illustrating network structure of NG Radio Access Network (NG-RAN) architecture.
Figure 4B:
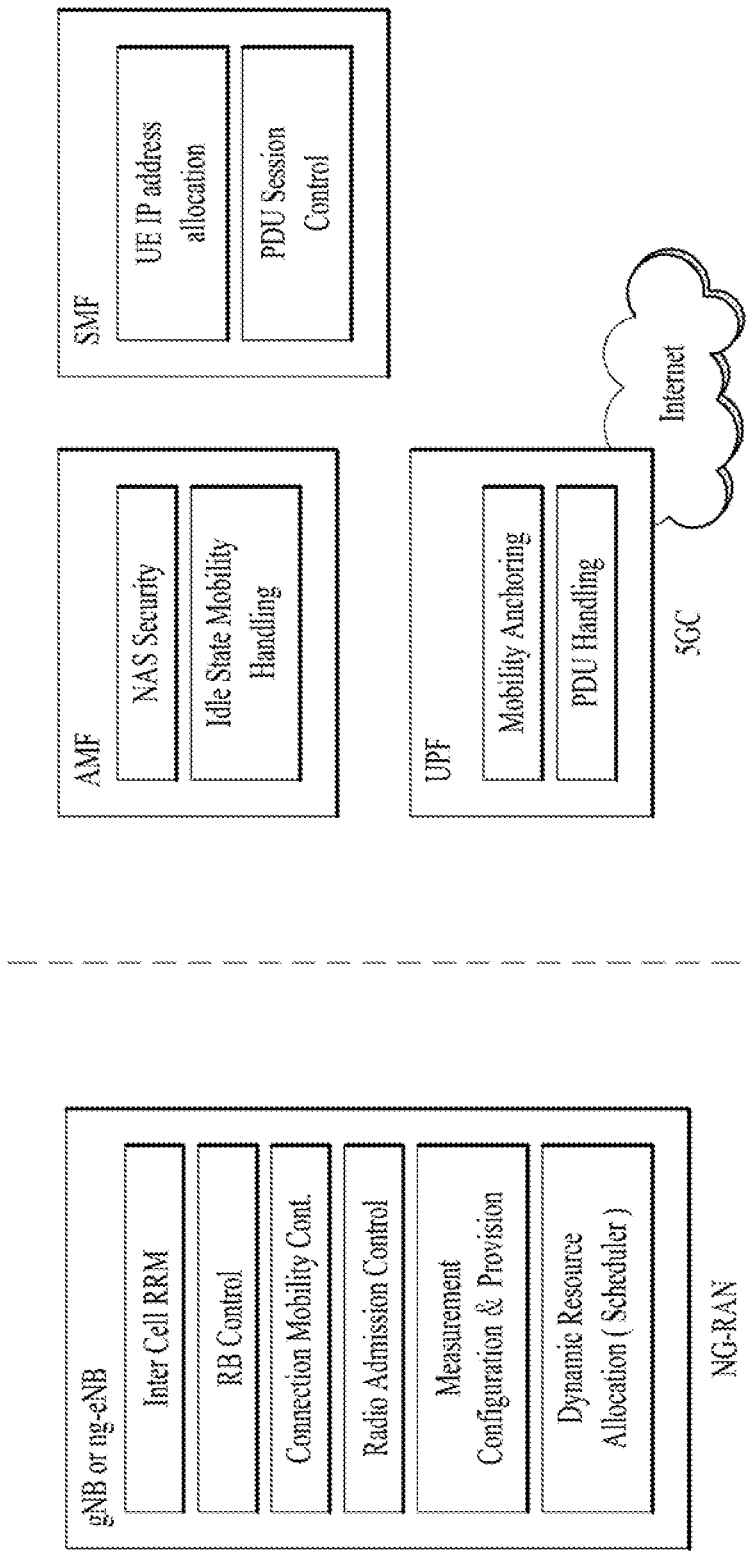
FIG. 4B is a block diagram depicting architecture of functional Split between NG-RAN and 5G Core Network (5GC).

FIG. 4A is a block diagram illustrating network structure of NG Radio Access Network (NG-RAN) architecture, and FIG. 4B is a block diagram depicting architecture of functional Split between NG-RAN and 5G Core Network (5GC).

An NG-RAN node is a gNB, providing NR user plane and control plane protocol terminations towards the UE, or an ng-eNB, providing E-UTRA user plane and control plane protocol terminations towards the UE.

The gNBs and ng-eNBs are interconnected with each other by means of the Xn interface. The gNBs and ng-eNBs are also connected by means of the NG interfaces to the 5GC, more specifically to the AMF (Access and Mobility Management Function) by means of the NG-C interface and to the UPF (User Plane Function) by means of the NG-U interface.

The Xn Interface includes Xn user plane (Xn-U), and Xn control plane (Xn-C). The Xn User plane (Xn-U) interface is defined between two NG-RAN nodes. The transport network layer is built on IP transport and GTP-U is used on top of UDP/IP to carry the user plane PDUs. Xn-U provides non-guaranteed delivery of user plane PDUs and supports the following functions: i) Data forwarding, and ii) Flow control. The Xn control plane interface (Xn-C) is defined between two NG-RAN nodes. The transport network layer is built on SCTP on top of IP. The application layer signalling protocol is referred to as XnAP (Xn Application Protocol). The SCTP layer provides the guaranteed delivery of application layer messages. In the transport IP layer point-to-point transmission is used to deliver the signalling PDUs. The Xn-C interface supports the following functions: i) Xn interface management, ii) UE mobility management, including context transfer and RAN paging, and iii) Dual connectivity.

The NG Interface includes NG User Plane (NG-U) and NG Control Plane (NG-C). The NG user plane interface (NG-U) is defined between the NG-RAN node and the UPF. The transport network layer is built on IP transport and GTP-U is used on top of UDP/IP to carry the user plane PDUs between the NG-RAN node and the UPF. NG-U provides non-guaranteed delivery of user plane PDUs between the NG-RAN node and the UPF.

The NG control plane interface (NG-C) is defined between the NG-RAN node and the AMF. The transport network layer is built on IP transport. For the reliable transport of signalling messages, SCTP is added on top of IP. The application layer signalling protocol is referred to as NGAP (NG Application Protocol). The SCTP layer provides guaranteed delivery of application layer messages. In the transport, IP layer point-to-point transmission is used to deliver the signalling PDUs.

NG-C provides the following functions: i) NG interface management, ii) UE context management, iii) UE mobility management, iv) Configuration Transfer, and v) Warning Message Transmission.

The gNB and ng-eNB host the following functions: i) Functions for Radio Resource Management: Radio Bearer Control, Radio Admission Control, Connection Mobility Control, Dynamic allocation of resources to UEs in both uplink and downlink (scheduling), ii) IP header compression, encryption and integrity protection of data, iii) Selection of an AMF at UE attachment when no routing to an AMF can be determined from the information provided by the UE, iv) Routing of User Plane data towards UPF(s), v) Routing of Control Plane information towards AMF, vi) Connection setup and release, vii) Scheduling and transmission of paging messages (originated from the AMF), viii) Scheduling and transmission of system broadcast information (originated from the AMF or O&M), ix) Measurement and measurement reporting configuration for mobility and scheduling, x) Transport level packet marking in the uplink, xi) Session Management, xii) Support of Network Slicing, and xiii) QoS Flow management and mapping to data radio bearers. The Access and Mobility Management Function (AMF) hosts the following main functions: i) NAS signalling termination, ii) NAS signalling security, iii) AS Security control, iv) Inter CN node signalling for mobility between 3GPP access networks, v) Idle mode UE Reachability (including control and execution of paging retransmission), vi) Registration Area management, vii) Support of intra-system and inter-system mobility, viii) Access Authentication, ix) Mobility management control (subscription and policies), x) Support of Network Slicing, and xi) SMF selection.

The User Plane Function (UPF) hosts the following main functions: i) Anchor point for Intra-/Inter-RAT mobility (when applicable), ii) External PDU session point of interconnect to Data Network, iii) Packet inspection and User plane part of Policy rule enforcement, iv) Traffic usage reporting, v) Uplink classifier to support routing traffic flows to a data network, vi) QoS handling for user plane, e.g. packet filtering, gating, UL/DL rate enforcement, and vii) Uplink Traffic verification (SDF to QoS flow mapping).

The Session Management function (SMF) hosts the following main functions: i) Session Management, ii) UE IP address allocation and management, iii) Selection and control of UP function, iv) Configures traffic steering at UPF to route traffic to proper destination, v) Control part of policy enforcement and QoS, vi) Downlink Data Notification.

Figure 5:
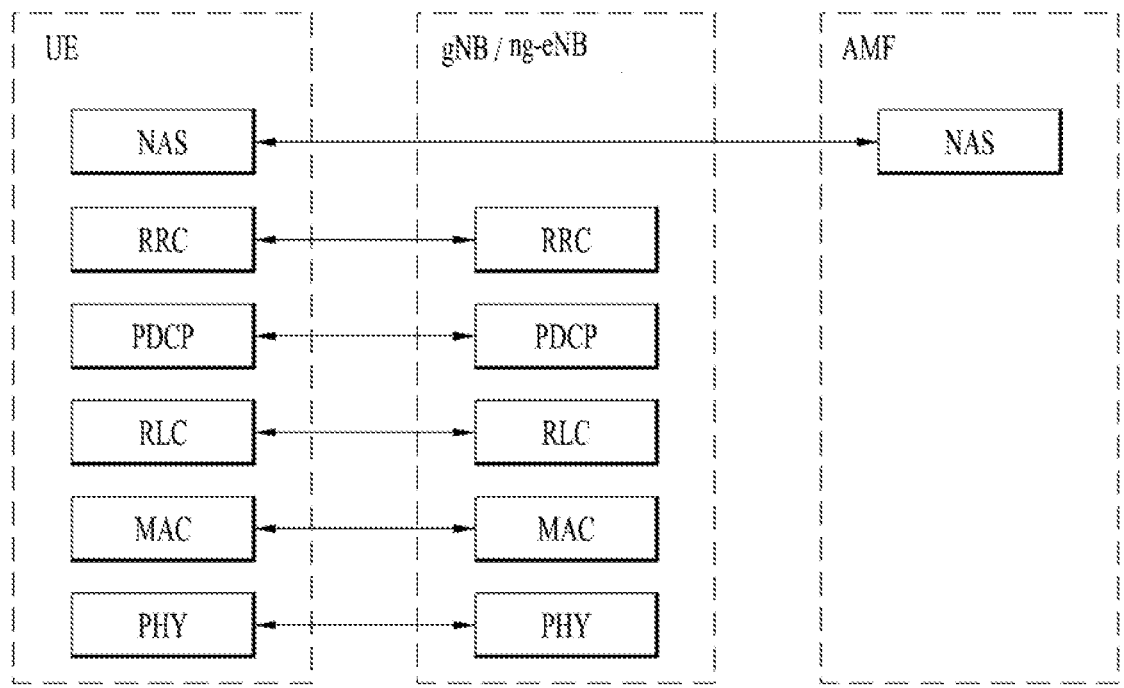
FIG. 5 is a diagram showing a control plane and a user plane of a radio interface protocol between a UE and a NG-RAN based on a 3rd generation partnership project (3GPP) radio access network standard.
Figure 5:
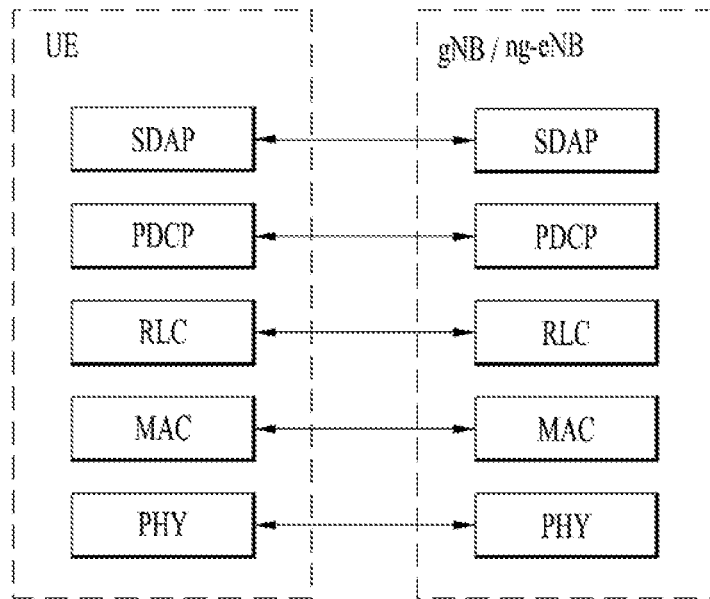

FIG. 5 is a diagram showing a control plane and a user plane of a radio interface protocol between a UE and a NG-RAN based on a 3rd generation partnership project (3GPP) radio access network standard.

The user plane protocol stack contains Phy, MAC, RLC, PDCP and SDAP (Service Data Adaptation Protocol) which is newly introduced to support 5G QoS model.

The main services and functions of SDAP entity include i) Mapping between a QoS flow and a data radio bearer, and ii) Marking QoS flow ID (QFI) in both DL and UL packets. A single protocol entity of SDAP is configured for each individual PDU session.

At the reception of an SDAP SDU from upper layer for a QoS flow, the transmitting SDAP entity may map the SDAP SDU to the default DRB if there is no stored QoS flow to DRB mapping rule for the QoS flow. If there is a stored QoS flow to DRB mapping rule for the QoS flow, the SDAP entity may map the SDAP SDU to the DRB according to the stored QoS flow to DRB mapping rule. And the SDAP entity may construct the SDAP PDU and deliver the constructed SDAP PDU to the lower layers.

Figure 6:
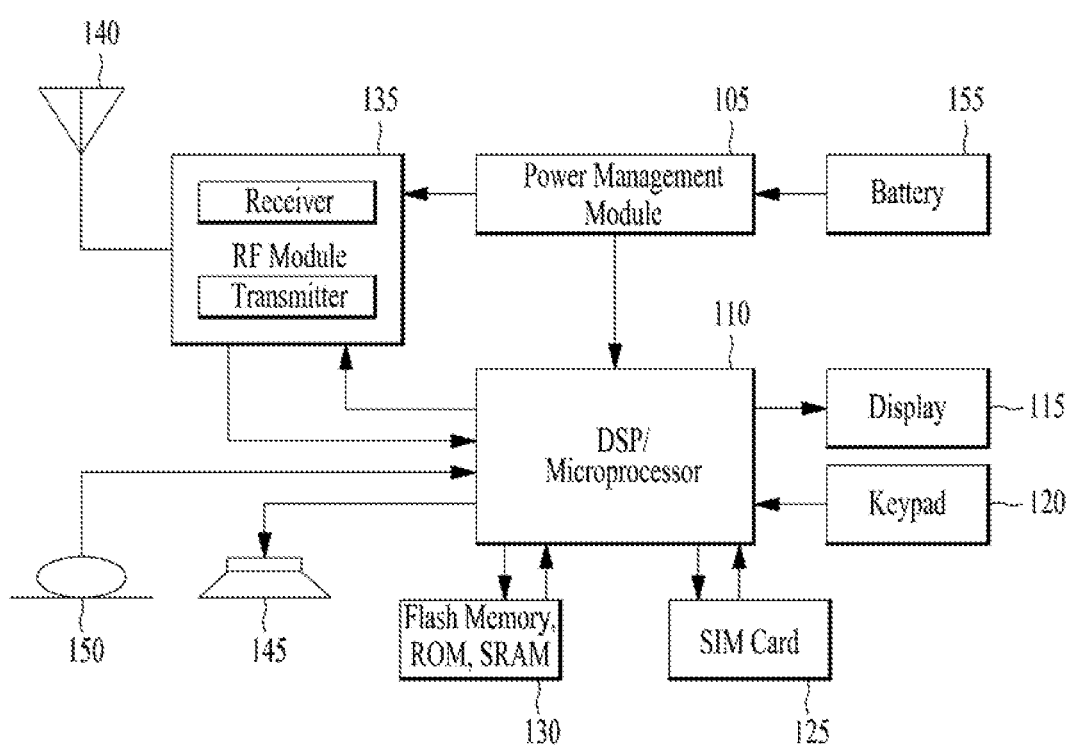
FIG. 6 is a block diagram of a communication apparatus according to an embodiment of the present invention.

FIG. 6 is a block diagram of a communication apparatus according to an embodiment of the present invention.

The apparatus shown in FIG. 6 can be a user equipment (UE) and/or eNB or gNB adapted to perform the above mechanism, but it can be any apparatus for performing the same operation.

As shown in FIG. 6, the apparatus may comprises a DSP/microprocessor (110) and RF module (transceiver; 135). The DSP/microprocessor (110) is electrically connected with the transceiver (135) and controls it. The apparatus may further include power management module (105), battery (155), display (115), keypad (120), SIM card (125), memory device (130), speaker (145) and input device (150), based on its implementation and designer's choice.

Specifically, FIG. 6 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 6 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIGS. 7A-7F are diagrams for signaling of power headroom reporting via a MAC CE.

The amount of transmission power available in each UE is also relevant for the uplink scheduler. Obviously, there is little reason to schedule a higher data rate than the available transmission power can support. In the downlink, the available power is immediately known to the scheduler as the power amplifier is located in the same node as the scheduler. For the uplink, the power availability, or power headroom is defined as the difference between the nominal maximum output power and the estimated output power for UL-SCH transmission.

This quantity can be positive as well as negative (on a dB scale), where a negative value would indicate that the network has scheduled a higher data rate than the terminal can support given its current power availability. The power headroom depends on the power-control mechanism and thereby indirectly on factors such as the interference in the system and the distance to the base stations. Information about the power headroom is fed back from the terminals to the eNodeB in a similar way as the buffer-status reports—that is, only when the terminal is scheduled to transmit on the UL-SCH.

A Power Headroom Report (PHR) shall be triggered if any of the following events occur: i) prohibitPHR-Timer expires or has expired and the path loss has changed more than dl-PathlossChange dB for at least one activated Serving Cell of any MAC entity which is used as a pathloss reference since the last transmission of a PHR in this MAC entity when the MAC entity has UL resources for new transmission; ii) periodicPHR-Timer expires; iii) upon configuration or reconfiguration of the power headroom reporting functionality by upper layers, which is not used to disable the function; iv) activation of an SCell of any MAC entity with configured uplink, v) addition of the PSCell, vi) prohibit PHR-Timer expires or has expired, when the MAC entity has UL resources for new transmission, and the following is true in this TTI for any of the activated Serving Cells of any MAC entity with configured uplink: there are UL resources allocated for transmission or there is a PUCCH transmission on this cell, and the required power backoff due to power management for this cell has changed more than dl-PathlossChange dB since the last transmission of a PHR when the MAC entity had UL resources allocated for transmission or PUCCH transmission on this cell.

It is also possible to configure a prohibit timer to control the minimum time between two power-headroom reports and thereby the signaling load on the uplink.

If the MAC entity has UL resources allocated for new transmission for this TTI the MAC entity shall start periodicPHR-Timer if it is the first UL resource allocated for a new transmission since the last MAC reset. If the Power Headroom reporting procedure determines that at least one PHR has been triggered and not cancelled, the MAC entity shall obtain the value of the Type 1 power headroom from the physical layer, and instruct the Multiplexing and Assembly procedure to generate and transmit a PHR MAC control element based on the value reported by the physical layer. And the MAC entity start or restart periodicPHR-Timer, start or restart prohibitPHR-Timer, and cancel all triggered PHR.

For the uplink transmission, the UE uses the PHR in order to provide the network with information about the difference between the nominal maximum transmit power and the estimated required transmit power. Thus, PHR indicates how much transmission power can be additionally used from the UE side.

In LTE, the Power Headroom Report (PHR) MAC control element is identified by a MAC PDU subheader with LCID as specified in Table 1. It has a fixed size and consists of a single octet defined as follows (FIG. 7a):

TABLE 1

| Index | LCID values |
| --- | --- |
| 00000 | CCCH |
| 00001-01010 | Identity of the logical channel |
| 01011 | CCCH |
| 01100 | CCCH |
| 01101-10011 | Reserved |
| 10100 | Recommended bit rate query |
| 10101 | SPS confirmation |
| 10110 | Truncated Sidelink BSR |
| 10111 | Sidelink BSR |
| 11000 | Dual Connectivity Power Headroom Report |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

'R' is reserved bit, set to "0";

Power Headroom (PH) field indicates the power headroom level. The length of the field is 6 bits. The reported PH and the corresponding power headroom levels are shown in Table 2;

TABLE 2

| PH | Power Headroom Level |
| --- | --- |
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

For extendedPHR, the Extended Power Headroom Report (PHR) MAC control element is identified by a MAC PDU subheader with LCID as specified in Table 1. It has a variable size and is defined in FIGS. 7b and 7c. When Type 2 PH is reported, the octet containing the Type 2 PH field is included first after the octet indicating the presence of PH per SCell and followed by an octet containing the associated $P_{CMAX,c}$ field (if reported). Then follows an octet with the Type 1 PH field and an octet with the associated $P_{CMAX,c}$ field (if reported), for the PCell. And then follows in ascending order based on the ServCellIndex an octet with the Type x PH field, wherein x is equal to 3 when the ul-Configuration-r14 is configured for this SCell (i.e., Sounding Reference Signal (SRS) is configured on the SCell), x is equal to 1 otherwise, and an octet with the associated $P_{CMAX,c}$ field (if reported), for each SCell indicated in the bitmap.

When the highest SCellIndex of SCell with configured uplink is less than 8, one octet with C fields is used for indicating the presence of PH per SCell (FIG. 7b), Otherwise, four octets are used (FIG. 7c).

The UE determines whether PH value for an activated Serving Cell is based on real transmission or a reference format by considering the downlink control information which has been received until and including the PDCCH occasion in which the first UL grant is received since a PHR has been triggered.

Figure 7A:
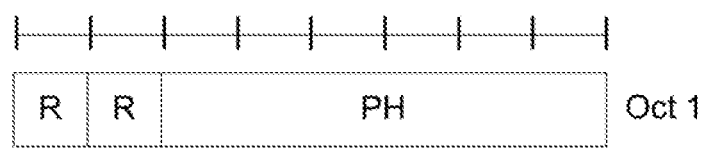
Figure 7B:
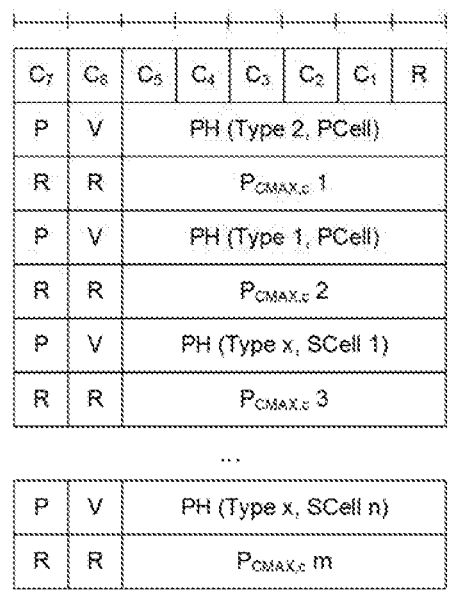

FIG. 7b is an example for Extended PHR MAC Control Elements with the highest SCellIndex of SCell with configured uplink is less than 8, and FIG. 7c is an example for Extended PHR MAC Control Elements with the highest SCellIndex of SCell with configured uplink is equal to or higher than 8.

The PHR MAC CEs are defined as follows:

'Ci field' indicates the presence of a PH field for the SCell with SCellIndex i. The Ci field set to "1" indicates that a PH field for the SCell with SCellIndex i is reported. The Ci field set to "0" indicates that a PH field for the SCell with SCellIndex i is not reported.

'V field' indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. For Type 3 PH, V=0 indicates real transmission on SRS and V=1 indicates that an SRS reference format is used. Furthermore, for Type 1, Type 2, and Type 3 PH, V=0 indicates the presence of the octet containing the associated $P_{CMAX,c}$ field, and V=1 indicates that the octet containing the associated $P_{CMAX,c}$ field is omitted.

'PH field' indicates the power headroom level. The length of the field is 6 bits. The reported PH and the corresponding power headroom levels are shown in Table 2.

'P field' indicates whether the MAC entity applies power backoff due to power management. The MAC entity shall set P=1 if the corresponding $P_{CMAX,c}$ field would have had a different value if no power backoff due to power management had been applied.

$P_{CMAX,c}$: if present, this field indicates the $P_{CMAX,c}$ or $\tilde{P}_{CMAX,c}$ used for calculation of the preceding PH field. The reported $P_{CMAX,c}$ and the corresponding nominal UE transmit power levels are shown in Table 3

TABLE 3

| $P_{CMAX,c}$ | Nominal UE transmit power level |
| --- | --- |
| 0 | PCMAX_C_00 |
| 1 | PCMAX_C_01 |
| 2 | PCMAX_C_02 |
| ... | ... |

TABLE 3-continued

| $P_{CMAX,c}$ | Nominal UE transmit power level |
|---|---|
| 61 | PCMAX_C_61 |
| 62 | PCMAX_C_62 |
| 63 | PCMAX_C_63 |

In NR, the Single Entry PHR MAC CE is identified by a MAC PDU subheader with LCID as specified in Table 4. It has a fixed size and consists of two octet defined as follows (FIG. 7d):

TABLE 4

| Index | LCID values |
|---|---|
| 000000 | CCCH |
| 000001-100000 | Identity of the logical channel |
| 100001-110110 | Reserved |
| 110111 | Configured Grant Confirmation |
| 111000 | Multiple Entry PHR |
| 111001 | Single Entry PHR |
| 111010 | C-RNTI |
| 111011 | Short Truncated BSR |
| 111100 | Long Truncated BSR |
| 111101 | Short BSR |
| 111110 | Long BSR |
| 111111 | Padding |

'R' is reserved bit, set to "0";

Power Headroom (PH) field indicates the power headroom level. The length of the field is 6 bits. The reported PH and the corresponding power headroom levels are shown in Table 5;

TABLE 5

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

$P_{CMAX,c}$ field indicates the $P_{CMAX,c}$ used for calculation of the preceding PH field. The reported $P_{CMAX,c}$ and the corresponding nominal UE transmit power levels are shown in Table 6.

TABLE 6

| $P_{CMAX,c}$ | Nominal UE transmit power level |
|---|---|
| 0 | PCMAX_C_00 |
| 1 | PCMAX_C_01 |
| 2 | PCMAX_C_02 |
| ... | ... |
| 61 | PCMAX_C_61 |
| 62 | PCMAX_C_62 |
| 63 | PCMAX_C_63 |

The Multiple Entry PHR MAC CE is identified by a MAC PDU subheader with LCID as specified in Table 4. It includes the bitmap, a Type 2 PH field and an octet containing the associated $P_{CMAX,c}$ field (if reported) for the PCell, a Type 2 PH field and an octet containing the associated $P_{CMAX,c}$ field (if reported) for either PSCell or PUCCH SCell, a Type 1 PH field and an octet containing the associated $P_{CMAX,c}$ field (if reported) for the PCell. It further includes, in ascending order based on the ServCellIndex, one or multiple of Type 1 PH fields and octets containing the associated $P_{CMAX,c}$ fields (if reported) for SCells indicated in the bitmap.

The presence of Type 2 PH field for PCell is configured by phr-Type2PCell, and the presence of Type 2 PH field for either PSCell or for PUCCH SCell is configured by phr-Type2OtherCell.

A single octet bitmap is used for indicating the presence of PH per SCell when the highest SCellIndex of SCell with configured uplink is less than 8, otherwise four octets are used.

The UE determines whether PH value for an activated Serving Cell is based on real transmission or a reference format by considering the downlink control information which has been received until and including the PDCCH occasion in which the first UL grant is received since a PHR has been triggered.

FIG. 7e is an example for Multiple Entry PHR MAC CE with the highest SCellIndex of SCell with configured uplink is less than 8, and FIG. 7f is an example for Multiple Entry PHR MAC CE with the highest SCellIndex of SCell with configured uplink is equal to or higher than 8.

The PHR MAC CEs are defined as follows:

'Ci field' indicates the presence of a PH field for the SCell with SCellIndex i. The Ci field set to "1" indicates that a PH field for the SCell with SCellIndex i is reported. The Ci field set to "0" indicates that a PH field for the SCell with SCellIndex i is not reported.

'V field' indicates if the PH value is based on a real transmission or a reference format. For Type 1 PH, V=0 indicates real transmission on PUSCH and V=1 indicates that a PUSCH reference format is used. For Type 2 PH, V=0 indicates real transmission on PUCCH and V=1 indicates that a PUCCH reference format is used. For Type 3 PH, V=0 indicates real transmission on SRS and V=1 indicates that an SRS reference format is used. Furthermore, for Type 1, Type 2, and Type 3 PH, V=0 indicates the presence of the octet containing the associated $P_{CMAX,c}$ field, and V=1 indicates that the octet containing the associated $P_{CMAX,c}$ field is omitted.

'PH field' indicates the power headroom level. The length of the field is 6 bits. The reported PH and the corresponding power headroom levels are shown in Table 2 (the corresponding measured values in dB for the NR Serving Cell are specified in TS 38.133 while the corresponding measured values in dB for the LTE Serving Cell are specified in TS 36.133).

'P field' indicates whether the MAC entity applies power backoff due to power management. The MAC entity shall set P=1 if the corresponding $P_{CMAX,c}$ field would have had a different value if no power backoff due to power management had been applied.

$P_{CMAX,c}$: if present, this field indicates the $P_{CMAX,c}$ or $\tilde{P}_{CMAX,c}$ used for calculation of the preceding PH field. The reported $P_{CMAX,c}$ and the corresponding nominal UE transmit power levels are shown in Table 6 (the corresponding measured values in dB for the NR Serving Cell are specified in TS 38.133 while the corresponding measured values in dB for the LTE Serving Cell are specified in TS 36.133).

Figure 8A:
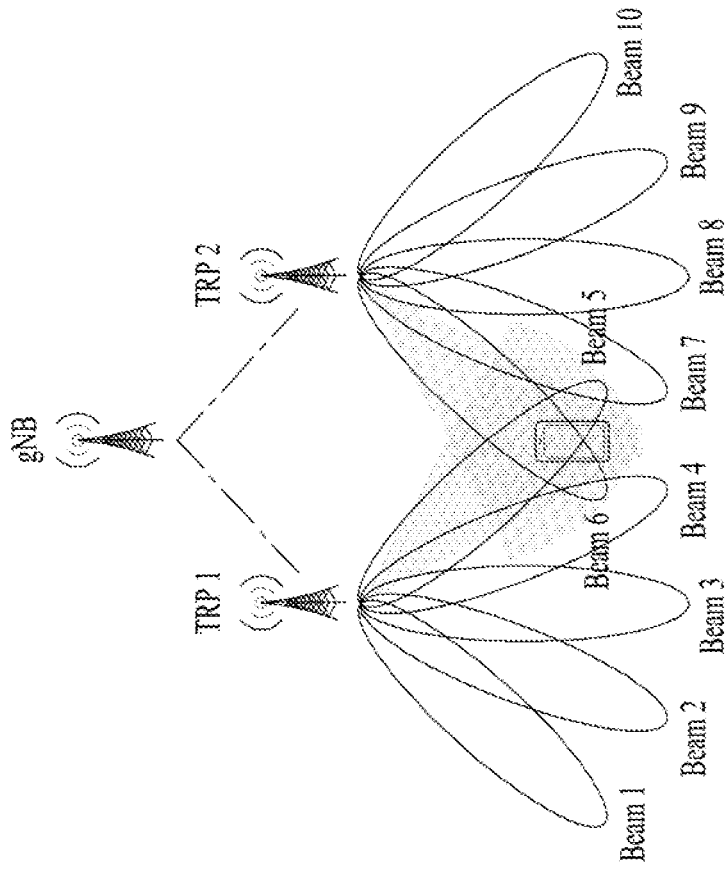
FIG. 8A is examples for multiple beam pair links.
Figure 8A:
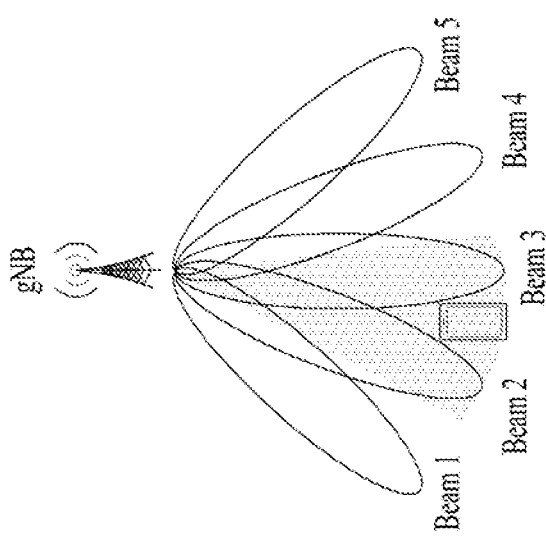
Figure 8B:
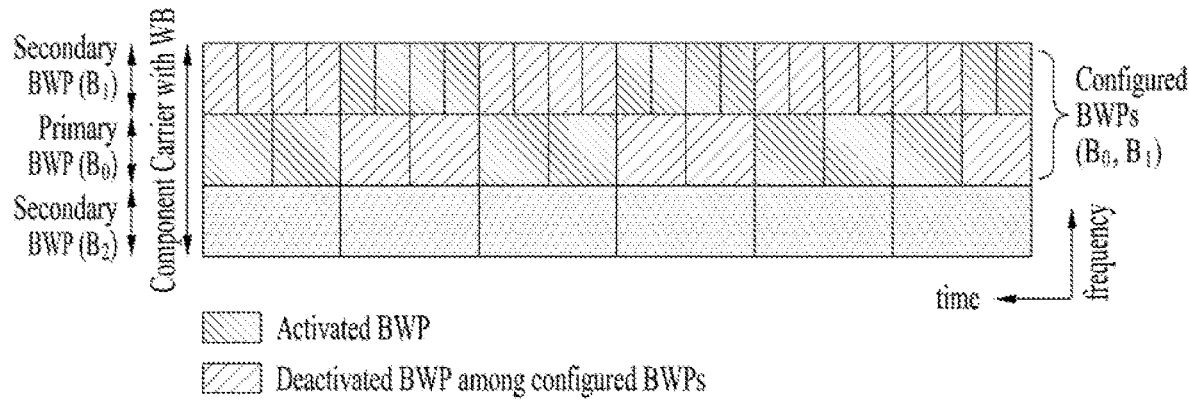
FIG. 8B is an example of PHR trigger in BWP activation/deactivation.
Figure 8B:
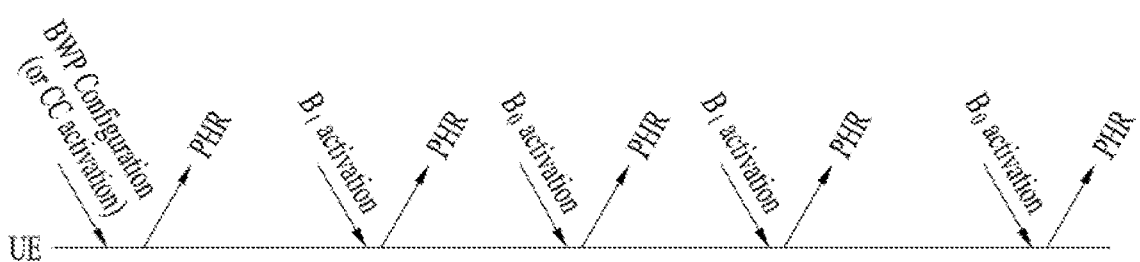

FIG. 8A is examples for multiple beam pair links, and FIG. 8B is an example of PHR trigger in BWP activation/deactivation.

In LTE, the Power Headroom Reporting (PHR) procedure is used to provide the serving eNB with information about the difference between the nominal UE maximum transmit power and the estimated power for UL-SCH transmission and also with information about the difference between the nominal UE maximum power and the estimated power for UL-SCH and PUCCH transmission on SpCell and PUCCH SCell. And the eNB can use the PHR report as input to the scheduler. Based on the available power headroom the scheduler will decide a suitable number of PRBs and an appropriate MCS as well a correct transmit power adjustment.

To provide link robustness between UE and gNB for both downlink and uplink, there may be multiple beam pair links between UE and gNB, where a beam pair link comprises a UE TX beam and a gNB RX beam. By using the multiple beam pair links, the UE may be able to transmit or receive a data repeatedly, if necessary. RAN1 agreed that UE should be able to maintain links with multiple DL beam pair of one cell between multiple TRPs and the UE. For UL link robustness, it would be necessary to maintain multiple UL beam pair links between multiple TRPs and the UE. In particular, pathloss between multiple TRPs may be significantly different than pathloss in multiple links within a single TRP due to their locations. This may result in different resource allocations e.g., including transmit power, between multiple beam pair links. The gNB should allocate the suitable UL resource for each beam pair based on the UE's PH information. The FIG. 8A describes the examples for multiple beam pair links.

In addition, beam forming is deemed a key technology of NR in order to compensate for a large path-loss. By using multiple antenna arrays, multiple narrow beams with higher antenna gain could cover similar level of cell coverage even on high frequency band. However, the narrow beam has the weakness that link quality can suddenly change depending on the UE movement or the blockage. So, if PHR is triggered every beam changes, the PHR overhead may increase even more due to the frequent beam change in the narrow beam scenario.

Meanwhile, similar to the multi-beam case, the gNB may have to allocate the suitable UL resource for each bandwidth part of a UE. To provide a variety of services, NR supports the wider bandwidth composed of multiple bandwidth parts with a different numerology. RAN1 agreed that the at least one DL bandwidth part and one UL bandwidth part is activated among the set of configured bandwidth parts for a given time instant. Also, RAN1 agreed to primarily focus on the single active bandwidth part case.

From the RAN2 perspectives, BWP Aggregation (BA) seems to be very similar to the carrier aggregation. The main difference between CA and BA is whether it is regarded as separate cells or a single cell.

In LTE CA, a power headroom report is triggered when the SCell is activated because the power allocation in the UE would vary depending on the number of activated SCells. Similarly, it may be necessary to trigger PHR for BWP activation because activating additional BWP would impact the power allocation of the UE.

In the meanwhile, in Rel-15, NR system introduces the wider bandwidth operation which has the maximum channel bandwidth of 400 MHz per carrier. Operating the wider bandwidth on a single carrier is more efficient than aggregating contiguous intra-band CCs with smaller bandwidth. In order to provide the carrier with maximum bandwidth for UEs with different RF chain capabilities, RAN1 agreed to support the aggregation of multiple sub-bands with smaller bandwidth. In this wider bandwidth operation, it assumes that one or multiple bandwidth part (BWP) configurations for each CC can be semi-statically signalled to a UE and each bandwidth part is associated with a specific numerology.

Currently, RAN1 has three alternatives to discuss how to activate/deactivate the DL/UL bandwidth parts, i.e., by means of DCI (Downlink Control Information), RRC signaling or MAC CE. Similar to the CA or DC in LTE, the PHR in NR may be defined to be triggered by the BWP activation. If the BWPs is activated/deactivated by means of DCI, since the BWP activation/deactivation would be dynamically performed by gNB, the PHR transmission will occur very frequently. The FIG. 8B describes an example of the frequent PHR trigger in case of BWP dynamic activation.

If BWP activation doesn't happen so frequently, there wouldn't be a signalling overhead issue with PHR trigger upon BWP activation. But if BWP is activated/deactivated by means of DCI and PHR is triggered every BWP activation, the PHR transmission may occur very frequently. In order to prevent the frequent PHR transmissions, RAN2 may need to further discuss whether prohibition is required for PHR trigger upon BWP activation If NR supports to dynamically activate or deactivate bandwidth part/beam and it wants to trigger PHR for the change of the BWP/beam activation/deactivation status, the PHR trigger events for these activation/deactivation should be changed to prevent the frequent PHR transmissions.

Figure 9:
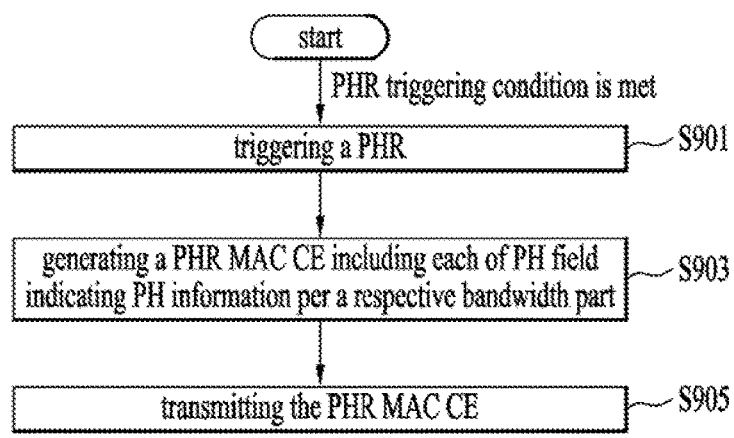
FIG. 9 is a conceptual diagram for triggering a power headroom reporting in wider bandwidth operation according to embodiments of the present invention.

FIG. 9 is a conceptual diagram for triggering a power headroom reporting in wider bandwidth operation according to embodiments of the present invention.

In LTE CA, the power headroom is contained in PHR MAC CE per activated cell because the power allocation may be different per cell. With wider bandwidth operation, since each BWP is associated with a different numerology, the gNB may need to know PH information per BWP to allocate suitable resources for a UE. Therefore, it may be desirable to report PH per BWP. Further, if NR supports to activate or deactivate one or more BWP(s) for a single CC, we think that it may be necessary to trigger PHR for BWP activation because activating additional BWP would impact the power allocation of the UE.

When the UE is configured with one or more BWPs per serving cell, the UE triggers a Power Headroom reporting (PHR) when a timer expires or has expired and a status of one of multiple bandwidth parts to be used by the UE is changed (S901).

Preferably, that the status of one of multiple bandwidth parts to be used by the UE is changed in a serving cell includes:

i) one of the multiple bandwidth parts is activated, or one of the multiple bandwidth parts is deactivated, or one of the multiple bandwidth parts is configured.

ii) one of the multiple bandwidth parts is switched to another BWP. In WB operation, the gNB can activate a single BWP for a UE at a given time instant. This means that a UE can transmit/receive data on a single BWP and gNB may indicate to switch from one BWP to another BWP (or to activate a new BWP) if it needs to activate another BWP. The purpose of the BWP switching command is to change an active BWP used in a particular cell. That is, the BWP switching command is for switching active BWP.

iii) when the MAC entity has UL resources for new transmission, and the following is true in this TTI for any of the activated Serving Cells of any MAC entity with configured uplink, there are the UL resources allocated for transmission or there is a PUCCH transmission on a serving cell, and the one of the multiple bandwidth parts is activated, deactivated, or configured or, reconfigured, or switched since the last transmission of a PHR when the MAC entity had UL resources allocated for transmission or PUCCH transmission on the serving cell.

For case i) of WB operation, the gNB can configure one or more BWP(s) for a CC of UE. This means that one or more BWP(s) could be allocated/(re)configured to a UE while/after gNB activates CC with WB, but before activating the specific DL/UL BWP. After BWP configuration, the gNB can activate or deactivate a specific BWP for a UE.

So, our invention proposes to trigger the PHR when BWP(s) of a UE is configured by gNB. If the BWP activation/deactivation is indicated by means of Downlink Control Information (DCI), i.e., dynamic BWP activation/deactivation, the PHR may be very frequently triggered since the prohibit timer would be independently performed with the PHR trigger event for BWP activation. So, in case of dynamic BWP activation/deactivation, it would be preferable that BWP configuration is used for PHR trigger event. If a BWP is configured at the same time as the serving cell activation, it would be preferable that the PHR is triggered when BWP is reconfigured.

Secondly, the UE can be a PHR when a (Secondary) BWP(s) is activated or deactivated. In WB operation, the gNB can activate or deactivate one or more BWP(s) for a UE. This means that a UE can transmit/receive data on the BWP(s) activated by any indication. So, our invention proposes to trigger the PHR when BWP(s) of a UE is newly activated or deactivated by the gNB. If a primary BWP is activated at the same time as the serving cell activation, it would be preferable that the PHR is triggered when a secondary BWP is activated.

In case ii), the UE can be a PHR when BWP is switched. In WB operation, the gNB can activate a single BWP for a UE at a given time instant. This means that a UE can transmit/receive data on a single BWP and gNB may indicate to switch from one BWP to another BWP (or to activate a new BWP) if it needs to activate another BWP.

The purpose of the BWP switching command is to change an active BWP used in a particular cell. That is, the BWP switching command is for switching active BWP. Currently, the UE is configured with four BWPs per cell, and only one of them will be in active state. When a BWP switching command is received via DCI, the UE deactivates the active BWP and activates the new BWP autonomously (i.e, there is no BWP deactivation command). Our invention proposes to trigger the PHR when a BWP of UE is switched to another BWP by gNB.

In cases of i) and ii), if there are no UL resources allocated for transmission in this TTI, the UE waits for the allocation of UL resources. The UE will transmit the triggered PHR when UL resources are allocated. In case iii), the UE can immediately transmit the triggered PHR when the event is met because the UE has UL resources allocated for transmission.

Preferably, the timer is a PHR prohibit timer indicating a number of subframes for PHR reporting, which is started when a MAC entity transmits the triggered PHR.

Preferably, the timer can reuse a same prohibitPHR-Timer as LTE, or the timer is newly introduced as a prohibitPHRActivation-Timer additionally for prohibiting PHR for another purpose.

If the legacy prohibitPHR-Timer is used for the BWP status change, the UE starts or restarts the prohibitPHR-Timer based on both path-loss changes and BWP status change. If the new timer (e.g., prohibitPHRActivation-Timer) is defined, the UE starts or restarts the timer only for the BWP status change. In this case, the newly defined timer can be set to the different value from the legacy prohibitPHR-Timer.

When the PHR is triggered, the UE generates a Power Headroom Reporting (PHR) Medium Access Control (MAC) Control Element (CE) including PH information per Bandwidth Part (BWP) within a serving cell (S903).

Preferably, each of PH field is indicates PH information per a respective bandwidth part.

And the UE transmits the PHR MAC CE to a network (S905).

Figure 10:
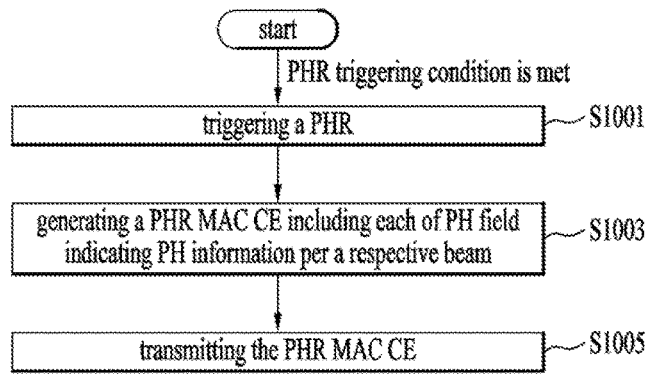
FIG. 10 is a conceptual diagram for triggering a power headroom reporting in multi-beam operation according to embodiments of the present invention.

FIG. 10 is a conceptual diagram for triggering a power headroom reporting in multi-beam operation according to embodiments of the present invention.

In LTE CA, the power headroom is contained in PHR MAC CE per activated cell because the power allocation may be different per cell. With multi-beam operation, since each beam pair (BP) is associated with a different numerology, the gNB may need to know PH information per BP to allocate suitable resources for a UE. Therefore, it may be desirable to report PH per BP. Further, if NR supports to activate or deactivate one or more BP(s) for a single CC, we think that it may be necessary to trigger PHR for BP activation because activating additional BP would impact the power allocation of the UE.

When the UE is configured with one or more BPs per serving cell, the UE triggers a Power Headroom reporting (PHR) when a timer expires or has expired and a status of one of multiple beams to be used by the UE is changed (S1001).

Preferably, that the status of one of multiple beams to be used by the UE is changed in a serving cell includes:

i) one of the multiple beams is activated, or one of the multiple beams is deactivated, or one of the multiple beams is configured.

ii) one, of the multiple beams is switched to another BP.

iii) when the MAC entity has UL resources for new transmission, and the following is true in this TTI for any of the activated Serving Cells of any MAC entity with configured uplink, there are the UL resources allocated for transmission or there is a PUCCH transmission on a serving cell, and the one of the multiple beams is activated, deactivated, or configured or, reconfigured, or switched since the last transmission of a PHR when the MAC entity had UL resources allocated for transmission or PUCCH transmission on the serving cell.

For case i), in multiple beam operation, the gNB can configure one or more BP(s) for a CC of UE. This means that one or more BP(s) could be allocated/(re)configured to a UE while/after gNB activates CC with multi-beam, but before activating the specific DL/UL BP. After multi-beam configuration, the gNB can activate or deactivate a specific BP for a UE.

So, our invention proposes to trigger the PHR when BP(s) of a UE is configured by gNB. If the BWP activation/deactivation is indicated by lower layer, the PHR may be very frequently triggered since the prohibit timer would be independently performed with the PHR trigger event for BP activation. If a BP is configured at the same time as the serving cell activation, it would be preferable that the PHR is triggered when BP is reconfigured.

Secondly, the UE can be a PHR when a BP(s) is activated or deactivated. In multi beam operation, the gNB can activate or deactivate one or more BP(s) for a UE. This means that a UE can transmit/receive data on the BP(s)

activated by any indication. So, our invention proposes to trigger the PHR when BP(s) of a UE is newly activated or deactivated by the gNB.

In case ii), the UE can be a PHR when BP is switched. In multi beam operation, the gNB can activate a single BP for a UE at a given time instant. This means that a UE can transmit/receive data on a single BP and gNB may indicate to switch from one BP to another BWP (or to activate a new BP) if it needs to activate another BP. Our invention proposes to trigger the PHR when a BP of UE is switched to another BP by gNB.

In cases of i) and ii), if there are no UL resources allocated for transmission in this TTI, the UE waits for the allocation of UL resources. The UE will transmit the triggered PHR when UL resources are allocated. In case iii), the UE can immediately transmit the triggered PHR when the event is met because the UE has UL resources allocated for transmission.

Preferably, the timer is a PHR prohibit timer indicating a number of subframes for PHR reporting, which is started when a MAC entity transmits the triggered PHR.

Preferably, the timer can reuse a same prohibitPHR-Timer as LTE, or the timer is newly introduced as a prohibitPHRActivation-Timer additionally for prohibiting PHR for another purpose.

If the legacy prohibitPHR-Timer is used for the BP status change, the UE starts or restarts the prohibitPHR-Timer based on both path-loss changes and BP status change. If the new timer (e.g., prohibitPHRActivation-Timer) is defined, the UE starts or restarts the timer only for the BP status change. In this case, the newly defined timer can be set to the different value from the legacy prohibitPHR-Timer.

When the PHR is triggered, the UE generates a Power Headroom Reporting (PHR) Medium Access Control (MAC) Control Element (CE) including PH information per Bandwidth Part (BWP) within a serving cell (S1003).

Preferably, each of PH field is indicates PH information per a respective beam pair.

And the UE transmits the PHR MAC CE to a network (S1005).

Figure 11:
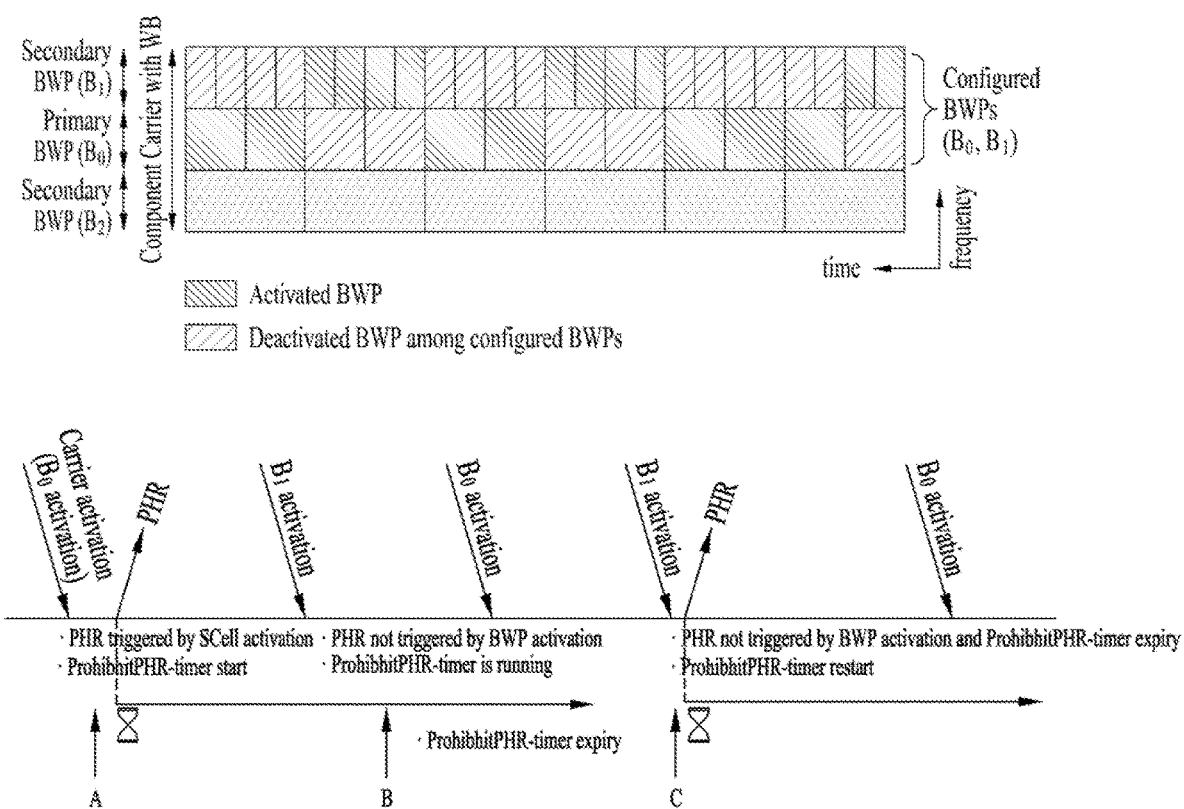
FIG. 11 is an example for triggering a power headroom reporting in wider bandwidth operation according to embodiments of the present invention.

FIG. 11 is an example for triggering a power headroom reporting in wider bandwidth operation according to embodiments of the present invention.

In this invention, UE behavior on the activated Scell with wider bandwidth is as follows, and FIG. 11 shows the example of PHR trigger based on the proposed scheme.

The carrier with wider bandwidth of a UE is activated by gNB and one or more bandwidth part(s) can be configured to a UE, e.g., $B_0$, $B_1$. The UE triggers PHR upon the Scell activation (A).

If there are UL resources allocated for transmission in this TTI, the UE immediately transmits the triggered PHR and starts prohibitPHR-timer, or If there are no UL resources allocated for transmission in this TTI, the UE waits for the allocation of UL resources. The UE transmits the triggered PHR upon UL resources allocation.

A new bandwidth part for the serving cell of a UE is activated by gNB, e.g., $B_1$ or $B_0$. The UE checks whether the prohibitPHR-timer is expired or not. The UE does not trigger PHR if the prohibitPHR-timer is running (B).

When the prohibitPHR-timer expires, the new bandwidth part of the serving cell is activated by gNB, e.g., $B_1$. The UE triggers PHR because the prohibitPHR-timer has expired (C). The UE transmits the triggered PHR if there are UL resources allocated for transmission in this TTI. And then, UE restarts the prohibitPHR-timer.

Figure 12:
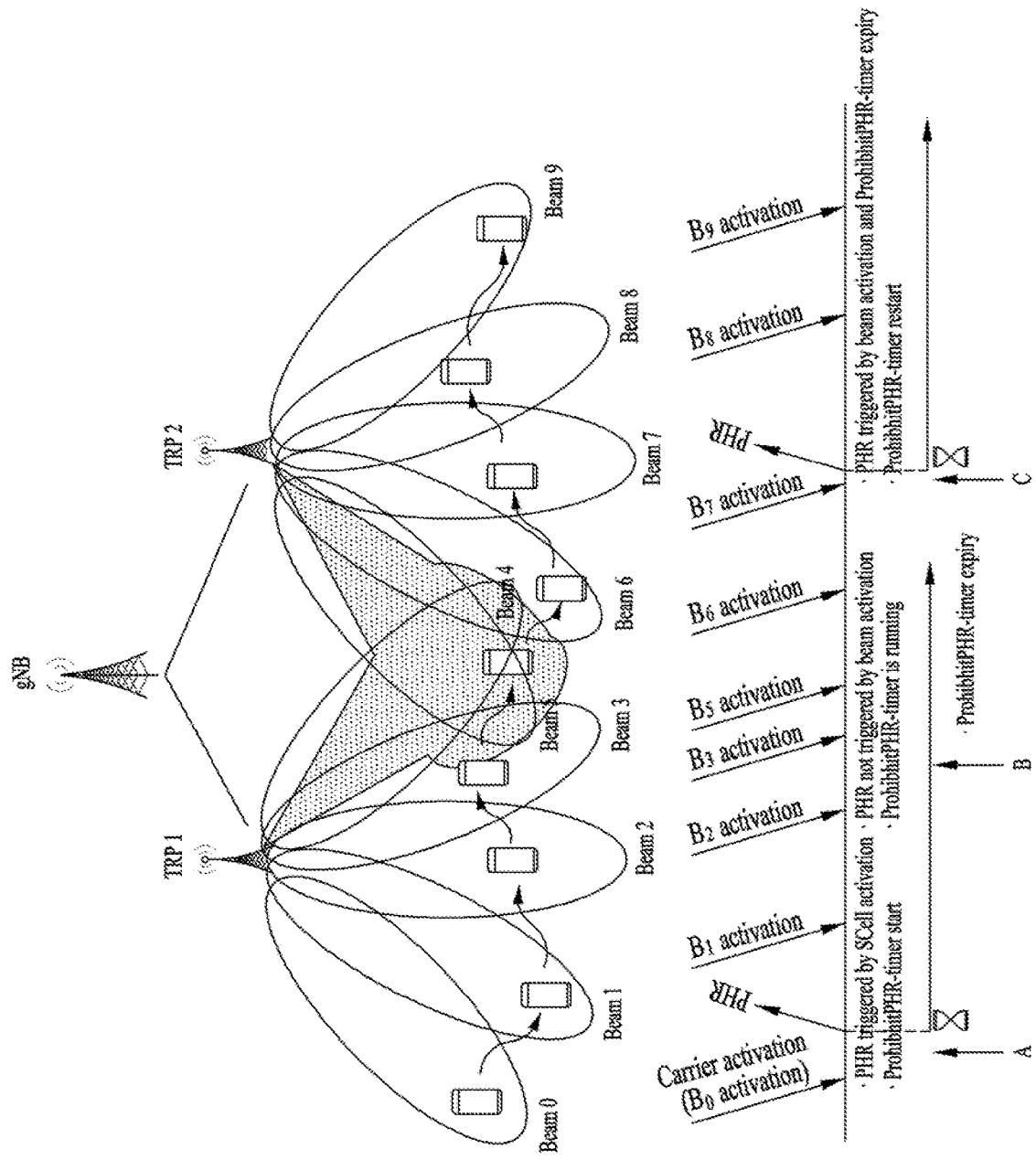
FIG. 12 is an example for triggering a power headroom reporting in multi-beam operation according to embodiments of the present invention.

FIG. 12 is an example for triggering a power headroom reporting in multi-beam operation according to embodiments of the present invention.

In this invention, UE behavior on the activated Scell with multi-beam is as follows, and the FIG. 12 shows the example of PHR trigger based on the proposed scheme.

The carrier with wider bandwidth of a UE is activated by gNB and one or more beam(s) can be configured to a UE, e.g., $B_0$~$B_9$. UE triggers PHR upon the Scell activation (A).

If there are UL resources allocated for transmission in this TTI, the UE immediately transmits the triggered PHR and starts prohibhitPHR-timer. Or if there are no UL resources allocated for transmission in this TTI, the UE waits for the allocation of UL resources. The UE transmits the triggered PHR upon UL resources allocation.

A new beam for the serving cell of a UE is activated by gNB, e.g., $B_1$, $B_2$, $B_3$, $B_5$ or $B_6$. The UE checks whether the prohibitPHR-timer is expired or not. The UE does not trigger PHR if the prohibitPHR-timer is running (B).

When the prohibitPHR-timer expires, the new beam of the serving cell is activated by gNB, e.g., $B_7$. The UE triggers PHR because the prohibitPHR-timer has expired (C). The UE transmits the triggered PHR if there are UL resources allocated for transmission in this TTI. And then, UE restarts the prohibitPHR-timer.

This invention can be introduced in the MAC specification as follows:

A Power Headroom Report (PHR) shall be triggered if any of the following events occur:

prohibitPHR-Timer expires or has expired and the path loss has changed more than dl-PathlossChange dB for at least one activated Serving Cell of any MAC entity which is used as a pathloss reference since the last transmission of a PHR in this MAC entity when the MAC entity has UL resources for new transmission;

periodicPHR-Timer expires;

upon configuration or reconfiguration of the power headroom reporting functionality by upper layers [8], which is not used to disable the function;

activation of an SCell of any MAC entity with configured uplink;

addition of the PSCell;

prohibitPHR-Timer expires or has expired and a BWP or beam of a serving cell is activated;

prohibitPHR-Timer expires or has expired, when the MAC entity has UL resources for new transmission, and the following is true in this TTI for any of the activated Serving Cells of any MAC entity with configured uplink:

there are UL resources allocated for transmission or there is a PUCCH transmission on this cell, and the required power backoff due to power management (as allowed by P-MPRc [10]) for this cell has changed more than dl-PathlossChange dB since the last transmission of a PHR when the MAC entity had UL resources allocated for transmission or PUCCH transmission on this cell.

Alternatively, this invention can be introduced in the MAC specification as follows:

A Power Headroom Report (PHR) shall be triggered if any of the following events occur:

prohibitPHR-Timer expires or has expired and the path loss has changed more than dl-PathlossChange dB for at least one activated Serving Cell of any MAC entity which is used as a pathloss reference since the last transmission of a PHR in this MAC entity when the MAC entity has UL resources for new transmission;

periodicPHR-Timer expires;

upon configuration or reconfiguration of the power headroom reporting functionality by upper layers [8], which is not used to disable the function;

activation of an SCell of any MAC entity with configured uplink;

addition of the PSCell;

prohibitPHR-Timer expires or has expired, when the MAC entity has UL resources for new transmission, and the following is true in this TTI for any of the activated Serving Cells of any MAC entity with configured uplink:

there are UL resources allocated for transmission or there is a PUCCH transmission on this cell, and the required power backoff due to power management (as allowed by P-MPRc [10]) for this cell has changed more than dl-PathlossChange dB since the last transmission of a PHR when the MAC entity had UL resources allocated for transmission or PUCCH transmission on this cell.

there are UL resources allocated for transmission or there is a PUCCH transmission on this cell, and a BWP or beam of this cell is activated since the last transmission of a PHR when the MAC entity had UL resources allocated for transmission or PUCCH transmission on this cell.

Based on the discussions so far, it is expected that the frequency of BWP activation or BP change is more frequent than the frequency of SCell activation or configuration. The need for a PHR triggering when a BWP is activated or a BP changed has already been explained above, but if the PHR is triggered whenever BWP is activated or BP is changed, the UE will experience a huge transmission overhead. The 'activation/configuration of BWP or beam' needs to be treated differently from 'activation/configuration of SCell'. If a prohibit timer is configured together with 'activation/configuration of BWP or beam', as we suggested, the UE can reduce overhead caused by excessive PHR triggering.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

What is claimed is:

1. A method for a User Equipment (UE) operating in a wireless communication system, the method comprising:

triggering a Power Headroom Reporting (PHR);

generating a PHR Medium Access Control (MAC) Control Element (CE) including multiple Power Headroom (PH) fields based on the triggering the PHR, wherein each of the multiple PH fields indicates PH information per a respective bandwidth part; and transmitting the PHR MAC CE to a network, wherein the PHR is triggered based on:

a timer expiring or having expired; and a status of one of multiple bandwidth parts, which are to be used by the UE, being changed, and wherein the timer is a PHR prohibit timer indicating a number of subframes for PHR reporting, and wherein the PHR prohibit timer is started when a MAC entity transmits the PHR.

2. The method according to claim 1, wherein that the status of one of multiple bandwidth parts to be used by the UE is changed in a serving cell includes:

one of the multiple bandwidth parts is activated, or one of the multiple bandwidth parts is deactivated, or one of the multiple bandwidth parts is configured, or when the MAC entity for the serving cell has uplink (UL) resources for new transmission, there are the UL resources allocated for transmission or there is a Physical Uplink Control Channel (PUCCH) transmission on the serving cell, and the one of the multiple bandwidth parts is activated or deactivated, or when the MAC entity for the serving cell has UL resources for new transmission, there are the UL resources allocated for transmission or there is the PUCCH transmission on the serving cell, and the one of the multiple bandwidth parts is configured or re-configured.

3. The method according to claim 1, wherein the UE operates in multiple-Bandwidth Part (BWP) operation.

4. A User Equipment (UE) for operating in a wireless communication system, the UE comprising:

a Radio Frequency (RF) transceiver; and a processor operably coupled with the RF transceiver and configured to:
trigger a Power Headroom Reporting (PHR);
generating a PHR Medium Access Control (MAC) Control Element (CE) including multiple Power Headroom (PH) fields based on the triggering the PHR,
wherein each of the multiple PH fields indicates PH information per a respective bandwidth part; and
transmit the PHR MAC CE to a network,
wherein the PHR is triggered based on:
a timer expiring or having expired; and
a status of one of multiple bandwidth parts, which are to be used by the UE, being changed, and
wherein the timer is a PHR prohibit timer indicating a number of subframes for PHR reporting, and wherein the PHR prohibit timer is started when a MAC entity transmits the PHR.

5. The UE according to claim 4, wherein that the status of one of multiple bandwidth parts to be used by the UE is changed in a serving cell includes:

one of the multiple bandwidth parts is activated, or
one of the multiple bandwidth parts is deactivated, or
one of the multiple bandwidth parts is configured, or
when the MAC entity for the serving cell has uplink (UL) resources for new transmission, there are the UL resources allocated for transmission or there is a Physical Uplink Control Channel (PUCCH) transmission on the serving cell, and the one of the multiple bandwidth parts is activated or deactivated, or
when the MAC entity for the serving cell has UL resources for new transmission, there are the UL resources allocated for transmission or there is the PUCCH transmission on the serving cell, and the one of the multiple bandwidth parts is configured or re-configured.

6. The UE according to claim 4, wherein the UE operates in multiple-Bandwidth Part (BWP) operation.

* * * * *